(12) United States Patent
Li

(10) Patent No.: US 11,783,759 B2
(45) Date of Patent: Oct. 10, 2023

(54) METHOD AND DEVICE OF LED DRIVING PULSE MODULATION

(71) Applicant: SHENZHEN SUNMOON MICROELECTRONICS CO., LTD., Guangdong (CN)

(72) Inventor: Zhaohua Li, Guangdong (CN)

(73) Assignee: SHENZHEN SUNMOON MICROELECTRONICS CO., LTD., Shenzhen (CN)

( * ) Notice: Subject to any disclaimer, the term of this patent is extended or adjusted under 35 U.S.C. 154(b) by 95 days.

(21) Appl. No.: 17/601,084

(22) PCT Filed: Jun. 4, 2021

(86) PCT No.: PCT/CN2021/098365
§ 371 (c)(1),
(2) Date: Oct. 4, 2021

(87) PCT Pub. No.: WO2022/001580
PCT Pub. Date: Jan. 6, 2022

(65) Prior Publication Data
US 2022/0319398 A1    Oct. 6, 2022

(30) Foreign Application Priority Data

Jun. 28, 2020  (CN) .......................... 202010600020.8

(51) Int. Cl.
*G09G 3/32*  (2016.01)
(52) U.S. Cl.
CPC ......... *G09G 3/32* (2013.01); *G09G 2310/027* (2013.01); *G09G 2320/0673* (2013.01)

(58) Field of Classification Search
CPC .............. G09G 3/32; G09G 2310/027; G09G 2320/0673; G09G 2320/0247; G09G 2320/0271; G09G 2320/0276; G09G 3/2025; G09G 3/2018
See application file for complete search history.

(56) References Cited

U.S. PATENT DOCUMENTS

2018/0061319 A1* 3/2018 Hong ..................... G09G 3/20
2019/0206330 A1* 7/2019 Kim ....................... H10K 59/40

FOREIGN PATENT DOCUMENTS

CN    109147653 A    1/2019
CN    209691363 U    11/2019

* cited by examiner

*Primary Examiner* — Andrew Sasinowski

(57) ABSTRACT

The present application provides a method of LED driving pulse modulation, comprising the following steps: calculating a display period according to a set number of sub-period, a set number of gclk per line and a set number of line scan; converting input gray data according to a set number of gray level; dividing the converted gray data according to the number of sub-period, the number of gclk per line, and a composite number to obtain high-gray data, low-gray data, and compensation data; and calculating a number of gray level that needs to be displayed in a current sub-period according to the high-gray data, the low-gray data, and the compensation data. With the method of LED driving pulse modulation, any number of sub-period and any number of gclk per line can be set to solve the problem of non-linear gamma, and make the display effect more delicate and true.

16 Claims, 3 Drawing Sheets

METHOD AND DEVICE OF LED DRIVING PULSE MODULATION

FIELD

The present application relates to LED (light-emitting diode) display technology, and in particular, to a method and device of LED driving pulse modulation.

BACKGROUND

In recent years, LEDs have been used as basic light-emitting components of a variety of light-emitting devices. In the field of LED display screens, a large-area display screen composed of dot matrix modules or pixel unit modules of LEDs is characterized by high reliability, long service life, strong environmental adaptability, high price-performance ratio, and low cost of use. In just ten years, it has rapidly grown into a mainstream product of flat panel display and has been widely used in the field of information display.

In the traditional multi-channel constant current LED driving chip, PWM (pulse-width modulation) method is mostly used for display control, and display effect of different gray scale brightness can be achieved by controlling light/dark time of the LED. When the displayed gray scale brightness is low, that is, the LED has a shorter light-emitting time during a working cycle, and a continuous non-lighting time is longer. At this time, when shooting with a high-speed camera, it will be easy to photograph the LED display screen with light and dark lines. Therefore, how to improve a visual refresh rate of the LED display screen is one of the important research directions of the LED display driving circuit.

Today's LED driving chips generally divide a entire display period into $2^N$ sub-periods, and then evenly distribute high-gray data into the $2^N$ sub-periods, and then evenly disperse low-gray data into each sub-period. This solution can break up the display period, and the overall refresh rate is improved without changing a total gray level. At the same time, the gray data is divided and evenly distributed, and the PWM pulse is output symmetrically, so that the display effect is clearer and more vivid, and the color is delicate and true. However, as the number of line scans increases, the time of the display period becomes longer, and it may eventually exceed a set time of one frame of data. Therefore, the controller will actively lose the period exceeding the frame time, which will cause the gamma value to be non-linear and the display effect is not ideal.

SUMMARY

In view of the shortcomings of the existing processing mechanism, the present application provides a method and device of LED driving pulse modulation that can set any number of sub-period and any number of gclk (i.e., gray scale clock) per line to solve the problem of non-linear gamma and make the display effect more delicate and true.

According to an aspect of the present application, a method of LED driving pulse modulation is provided, comprises the following steps: calculating a display period according to a set number of sub-period, a set number of gclk per line and a set number of line scan; converting input gray data according to a set number of gray level; dividing the converted gray data according to the number of sub-period, the number of gclk per line, and a composite number to obtain high-gray data, low-gray data, and compensation data; and calculating a number of gray level that needs to be displayed in a current sub-period according to the high-gray data, the low-gray data, and the compensation data.

In the method of LED driving pulse modulation according to an embodiment of the present application, the number of gray level is set according to the number of sub-period and the number of gclk per line.

In the method of LED driving pulse modulation according to an embodiment of the present application, the method further comprises: comparing the display period with a set frame rate time, and if the display period is greater than the set frame rate time, adjusting the number of sub-period or the number of gclk per line, so that the time of the display period is less than the set frame rate time.

In the method of LED driving pulse modulation according to an embodiment of the present application, in the step of converting the input gray data according to the set number of gray level, a gamma table corresponding to the number of gray level is calculated by a controller, and the input gray data is converted according to the gamma table, or the input gray data is normalized according to the number of gray level by a LED driving chip.

According to the other aspect of the present application, a device of LED driving pulse modulation is provided, comprises: a first calculation module being configured to calculate a display period according to a set number of sub-period, a set number of gclk per line and a set number of line scan; a conversion module being configured to convert input gray data according to a set number of gray level; a division module being configured to divide the converted gray data according to the number of sub-period, the number of gclk per line, and a composite number to obtain high-gray data, low-gray data, and compensation data; and a second calculation module being configured to calculate a number of gray level that needs to be displayed in a current sub-period according to the high-gray data, the low-gray data, and the compensation data.

In the device of LED driving pulse modulation according to an embodiment of the present application, the device further comprises a setting module being configured to set the number of gray level according to the number of sub-period and the number of gclk per line.

In the device of LED driving pulse modulation according to an embodiment of the present application, the device further comprises an adjustment module being configured to comparing the display period with a set frame rate time, and if the display period is greater than the set frame rate time, adjusting the number of sub-period or the number of gclk per line, so that the time of the display period is less than the set frame rate time.

In the device of LED driving pulse modulation according to an embodiment of the present application, the conversion module calculates a gamma table corresponding to the number of gray level by a controller, and converts the input gray data according to the gamma table, or normalizes the input gray data according to the number of gray level by a LED drive chip.

According to another aspect of the present application, n LED display device is provided, comprises at least one processor and a memory communicatively connected with the at least one processor; wherein the memory stores instructions executable by the at least one processor, and the instructions are executed by the at least one processor so that the at least one processor executes the method of LED driving pulse modulation as described above.

According to another aspect of the present application, a non-transitory computer-readable storage medium is also provided, wherein the non-transitory computer-readable storage medium stores computer instructions, and the computer instructions are used to cause a computer to execute the method of LED driving pulse modulation as described above.

Implementation of the embodiments of the present application has the following beneficial effects: the method and device of LED driving pulse modulation provided by the present application calculates the display period according to the set number of sub-period, number of gclk per line, and number of line scan, and then compares the display period with the set frame rate time and if the calculated display period is greater than the set frame rate time, adjusts the set number of sub-period or the set number of gclk per line, and then calculate the gray scale according to the adjusted number of sub-period and number of gclk per line, and then converts the gamma value according to the gray level, thus, it can be ensured that the gamma value remains linear under the condition that the refresh rate remains unchanged, so that the display effect is more realistic.

BRIEF DESCRIPTION OF THE DRAWINGS

In order to more clearly explain the embodiments of the present application or the technical solutions in the prior art, the drawings used in the description of the embodiments or the prior art will be briefly introduced below. Obviously, the drawings in the following description are merely some embodiments of the present application. For those of ordinary skill in the art, other drawings can be obtained based on these drawings without creative efforts.

DETAILED DESCRIPTION

In the following, technical solutions according to embodiments of the present application will be clearly and completely described with reference to the drawings of the embodiments of the present application. Obviously, the described embodiments are only a part of the embodiments of the present application, but not all the embodiments. Based on the embodiments of the present application, all other embodiments obtained by a person of ordinary skill in the art without creative efforts shall fall within the protection scope of the present application.

Figure 1:
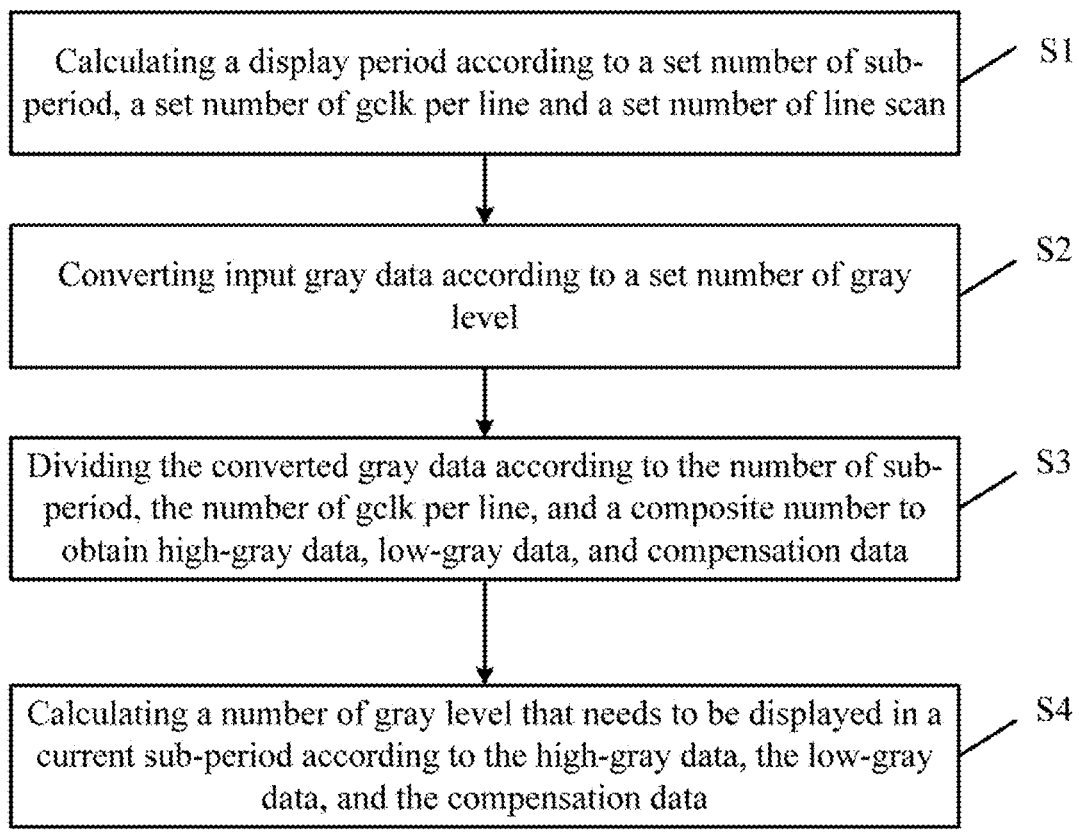
FIG. 1 shows a flowchart of a method of LED driving pulse modulation according to an embodiment of the present application.

FIG. 1 shows a flowchart of a method of LED driving pulse modulation according to an embodiment of the present application. As shown in FIG. 1, the method of LED driving pulse modulation according to the present application comprises the following steps:

Step S1: Calculating a display period according to a set number of sub-period, a set number of gclk per line and a set number of line scan.

Figure 2:
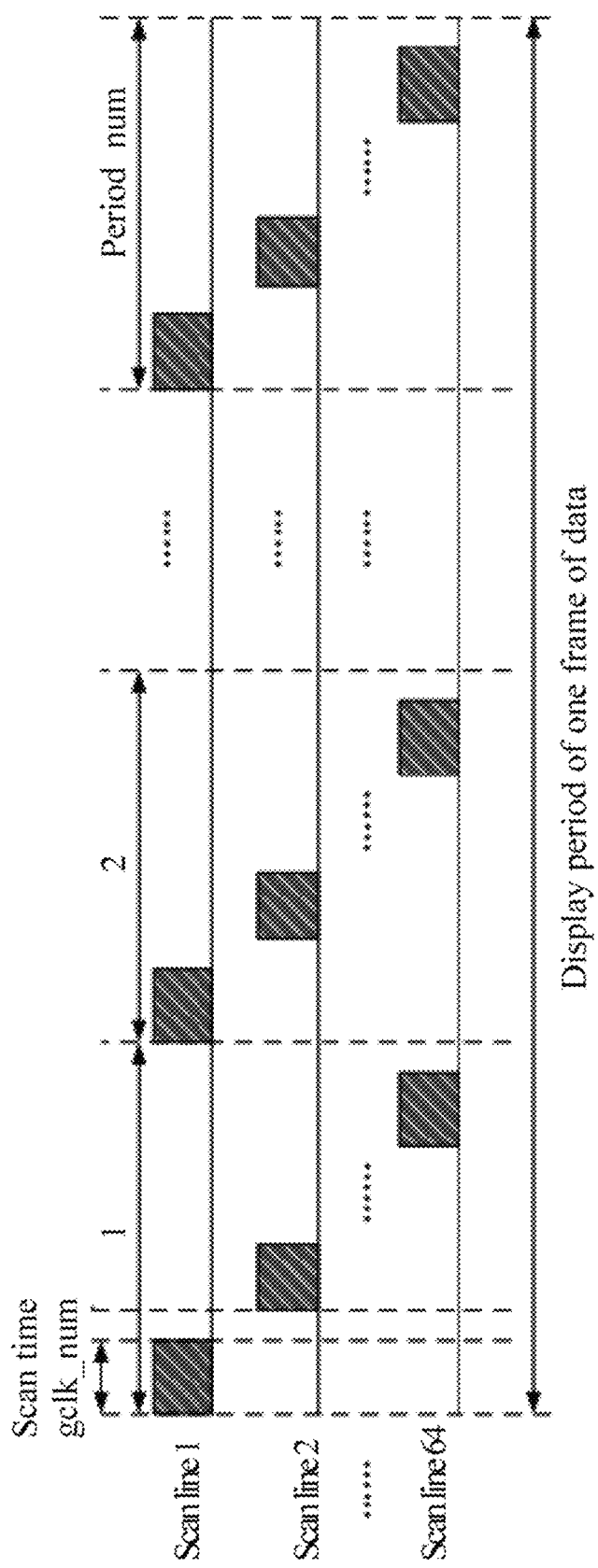
FIG. 2 shows a schematic diagram of a display period of one frame of data.

Specifically, in this embodiment of the present application, before starting to run, the number of sub-period (i.e., period_num, as shown in FIG. 2), the number of gclk per line (i.e., gclk_num, as shown in FIG. 2, the number of gclk per line corresponds to line scan time) and the number of line scan are set; and then the display period is calculated according to the set number of sub-period, the set number of gclk per line and the set number of line scan; and then the display period is compared with a set frame rate time, and if the calculated display period is greater than the set frame rate time, the set number of sub-period or the set number of gclk per line are adjusted so that the time of the display period is less than the set frame rate time. It should be noted that an adjustment can be achieved by reducing the number of gclk per line (a refresh rate is reduced to a certain extent), or by reducing the number of sub-period (the refresh rate remains unchanged).

Step S2: Converting input gray data according to a set number of gray level.

Specifically, in this embodiment of the present application, the number of gray level is set according to the number of sub-period and the number of gclk per line set above, thus the number of gray level is period_num*gclk_num; and then the number of gray level is converted to a corresponding gamma value; and then the input gray data is converted. It should be noted that a gamma table can be converted by calculating a gamma table of the set number of gray level through a normalization algorithm with a existing 65536-level gamma table by a controller, or by converting input 16 bit data (corresponding to 65536 levels) to a gamma table of the set number of gray level through a normalization algorithm by a LED driving chip. Therefore, in this step S2, the gamma table corresponding to the number of gray level can be calculated by the controller, and the input gray data can be converted according to the gamma table, or the input gray data can be normalized according to the number of gray level by the LED driving chip.

Step S3: Dividing the converted gray data according to the number of sub-period, the number of gclk per line, and a composite number to obtain high-gray data, low-gray data, and compensation data.

Specifically, in this embodiment of the present application, the gray data that has undergone gamma value conversion is divided into a number of composite data that needs to be displayed at least for each sub-period (i.e., high-gray data), a number of synthesized data that needs to be evenly broken up (i.e., low-gray data), and gray values that cannot be synthesized into one synthesized data (i.e., compensation data) according to the composite number, the number of sub-period, and the number of gclk per line.

Step S4: Calculating a number of gray level that needs to be displayed in a current sub-period according to the high-gray data, the low-gray data, and the compensation data.

Specifically, in this embodiment of the present application, when the LED driving chip is working, the gray data that needs to be displayed in the current sub-period is calculated according to the read high-gray data, low-gray data, and compensation data. It should be noted that no matter what number of period is set, the low-gray data will be evenly scattered to each period according to a rule of dichotomy, so that the refresh rate of the low-gray data is improved, the display effect is clearer and more vivid, and the color is delicate and true.

According to the method of LED driving pulse modulation of the present application, the display period is calculated according to the set number of sub-period, number of gclk per line, and number of line scan; and then the display period is compared with the set frame rate time, and if the calculated display period is greater than the set frame rate time, the set number of sub-period or number of gclk per line is adjusted. Then the number of gray level is calculated according to the adjusted number of sub-period and number of gclk per line; and then the gamma value is converted according to the gray levels, so that the gamma value can be guaranteed to be linear while the refresh rate is unchanged, so that the display effect is more real.

Figure 3:
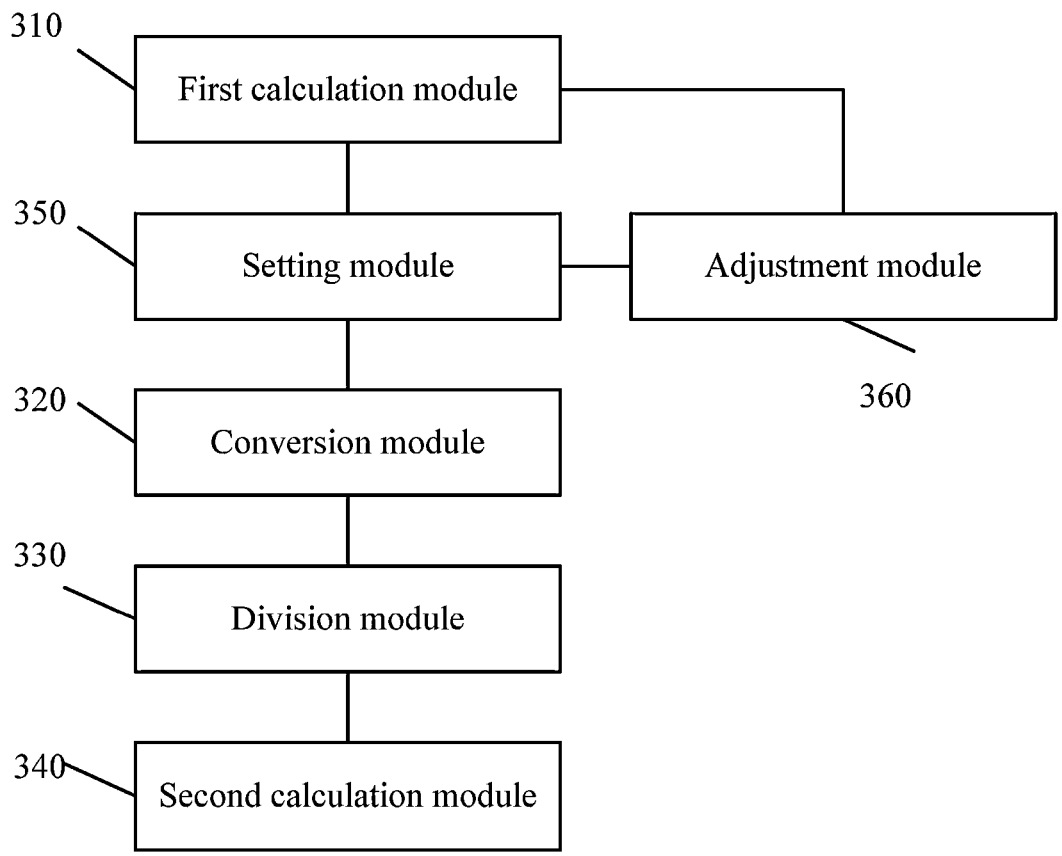
FIG. 3 shows a schematic diagram of a device of LED driving pulse modulation according to an embodiment of the present application.

With reference to FIG. 3, based on a same inventive concept, the present application also discloses a device of LED driving pulse modulation, comprising a first calculation module 310, a conversion module 320, a division module 330, a second calculation module 340, a setting module 350 and an adjustment module 360.

The first calculation module 310 is configured to calculate the display period according to the set number of sub-period, number of gclk per line, and number of line scan. Specifically, in this embodiment of the present application, before starting to run, the number of sub-period (i.e., period_num, as shown in FIG. 2), the number of gclk per line (i.e., gclk_num, as shown in FIG. 2, the number of gclk per line corresponds to line scan time) and the number of line scan are set; and then the display period is calculated according to the set number of sub-period, the set number of gclk per line and the set number of line scan; and then the display period is compared with a set frame rate time, and if the calculated display period is greater than the set frame rate time, the set number of sub-period or the set number of gclk per line are adjusted so that the time of the display period is less than the set frame rate time. It should be noted that an adjustment can be achieved by reducing the number of gclk per line (a refresh rate is reduced to a certain extent), or by reducing the number of sub-period (the refresh rate remains unchanged).

Therefore, the setting module 350 is configured to set the number of gray level according to the number of sub-period and the number of gclk per line. The adjustment module 360 is configured to compare the display period with the set frame rate time, and if the display period is greater than the set frame rate time, the set number of sub-period or the set number of gclk per line are adjusted so that the time of the display period is less than the set frame rate time. The conversion module 320 is configured to convert the input gray data according to the set number of gray level.

In an embodiment of the present application, the number of gray level is set according to the number of sub-period and the number of gclk per line set above, thus the number of gray level is period_num*gclk_num; and then the number of gray level is converted to a corresponding gamma value; and then the input gray data is converted. It should be noted that a gamma table can be converted by calculating a gamma table of the set number of gray level through a normalization algorithm with a existing 65536-level gamma table by a controller, or by converting input 16 bit data (corresponding to 65536 levels) to a gamma table of the set number of gray level through a normalization algorithm by a LED driving chip. Therefore, the conversion module 320 calculates the gamma table corresponding to the number of gray level by the controller, and converts the input gray data according to the gamma table, or normalizes the input gray data according to the number of gray level by the LED driving chip.

The division module 330 is configured to divide the converted gray data according to the number of sub-period, the number of gclk per line, and a composite number to obtain high-gray data, low-gray data, and compensation data. The second calculation module 340 is configured to calculate a number of gray level that needs to be displayed in a current sub-period according to the high-gray data, the low-gray data, and the compensation data.

Specifically, in an embodiment of the present application, when the LED driving chip is working, the gray data that needs to be displayed in the current sub-period is calculated according to the read high-gray data, low-gray data, and compensation data. It should be noted that no matter what number of period is set, the low-gray data will be evenly scattered to each period according to a rule of dichotomy, so that the refresh rate of the low-gray data is improved, the display effect is clearer and more vivid, and the color is delicate and true.

Function of each functional module described in the device embodiment of the present application can be specifically implemented according to the method in the foregoing method embodiment, and the specific implementation process can refer to the relevant description of the foregoing method embodiment, and will not be repeated here.

It should be pointed out that in the above description of the various modules, the division into these modules is for clarity of illustration. However, in actual implementation, the boundaries of various modules may be blurred. For example, any or all functional modules in this document can share various hardware and/or software elements. For another example, any and/or all functional modules in this document may be implemented in whole or in part by executing software instructions by a common processor. In addition, various software sub-modules executed by one or more processors can be shared among various software modules. Accordingly, unless expressly required, the scope of the present application is not limited by mandatory boundaries between various hardware and/or software elements.

Figure 4:
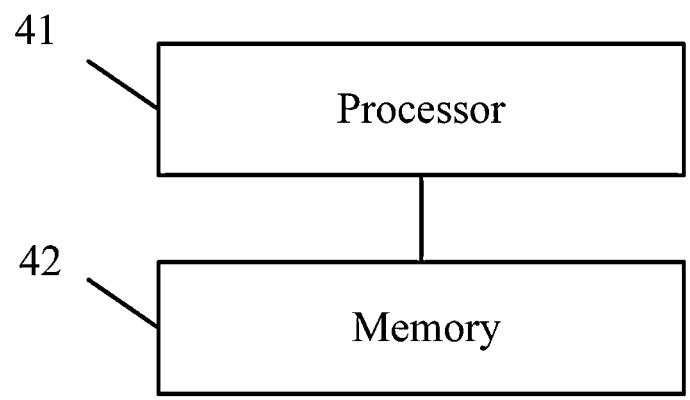
FIG. 4 shows a schematic structural diagram of an LED display device according to an embodiment of the present application.

FIG. 4 is a schematic diagram of hardware structure of an LED display device according to an embodiment of the present application. As shown in FIG. 4, the device comprises one or more processors 41 and a memory 42. In FIG. 4, one processor 41 is taken as an example. The processor 41 and the memory 42 may be connected by a bus or in other ways. In FIG. 4, the connection by a bus is taken as an example.

The processor 41 may be a central processing unit (CPU). The processor 41 may also be other general-purpose processors, digital signal processors (DSP), application specific integrated circuits (ASIC), field-programmable gate array (FPGA), or chips such as other programmable logic devices, discrete gates, transistor logic devices or discrete hardware components, or a combination of the above types of chips. The general-purpose processor may be a microprocessor or the processor may also be any conventional processor or the like.

As a non-transitory computer-readable storage medium, the memory 42 can be used to store non-transitory software programs, non-transitory computer executable programs and modules, such as program instructions/modules corresponding to the method of LED driving pulse modulation according to the embodiments of the present application. The processor 41 executes various functional applications and data processing of a server by running non-transitory software programs, instructions, and modules stored in the memory 42, that is, realizes the method of LED driving pulse modulation in the foregoing embodiments.

The memory 42 may includes a program storage area and a data storage area. The program storage area may store an operating system and application programs required by at least one function; the data storage area may store data created according to the use of the device of LED driving pulse modulation. In addition, the memory 42 may include a high-speed random access memory, and may also include a non-transitory memory, such as at least one magnetic disk storage device, a flash memory device, or other non-transitory solid-state storage devices. In some embodiments, the memory 42 may optionally include a memory remotely provided with respect to the processor 41, and the remote memory may be connected to the device of LED driving pulse modulation via a network. Examples of the aforementioned network includes, but are not limited to, the internet, corporate intranet, local area network, mobile communication network, and combinations thereof.

The one or more modules are stored in the memory 42, and when executed by the one or more processors 41, the method of LED driving pulse modulation as described above is executed.

The above-mentioned devices can execute the methods provided in the embodiments of the present application, and have corresponding functional modules and beneficial effects for executing the methods. For technical details that are not described in detail in this embodiment, for details, please refer to the relevant description in the embodiment shown in FIG. 1.

A non-transitory computer storage medium is also provided according to an embodiment of the present application. The computer storage medium stores computer-executable instructions, and the computer-executable instructions can execute the method of LED driving pulse modulation as described above. Wherein, the computer storage medium may be a magnetic disk, an optical disk, a read-only memory (ROM), a random access memory (RAM), a flash memory, a hard disk (HDD) or solid-state drive (SSD), etc.; the computer storage medium may also include a combination of the foregoing types of memories.

Those skilled in the art can understand that all or part of the processes of the method in the above-mentioned embodiments can be implemented by instructing relevant hardware through a computer program. The program can be stored in a computer readable storage medium. During execution, it may include the procedures of the above-mentioned method embodiments. Wherein, the storage medium can be a magnetic disk, an optical disc, a read-only memory (ROM) or a random storage memory (RAM), etc.

Although the embodiments of the present application have been described in conjunction with the accompanying drawings, those skilled in the art can make various modifications and variations without departing from the spirit and scope of the present application, and such modifications and variations fall under the appended rights within the scope defined by the claims.

The invention claimed is:

1. A method of LED driving pulse modulation, characterized in that the method comprises the following steps:
    calculating a display period according to a set number of sub-period, a set number of gclk (i.e., gray scale clock) per line and a set number of line scan;
    converting input gray data according to a set number of gray level;
    dividing the converted gray data according to the number of sub-period, the number of gclk per line, and a composite number to obtain high-gray data, low-gray data, and compensation data; and
    calculating a number of gray level that needs to be displayed in a current sub-period according to the high-gray data, the low-gray data, and the compensation data.

2. The method of LED driving pulse modulation according to claim 1, wherein the number of gray level is set according to the number of sub-period and the number of gclk per line.

3. The method of LED driving pulse modulation according to claim 1, wherein the method further comprises:
    comparing the display period with a set frame rate time, and if the display period is greater than the set frame rate time, adjusting the number of sub-period or the number of gclk per line, so that the time of the display period is less than the set frame rate time.

4. The method of LED driving pulse modulation according to claim 1, wherein in the step of converting the input gray data according to the set number of gray level, a gamma table corresponding to the number of gray level is calculated by a controller, and the input gray data is converted according to the gamma table, or the input gray data is normalized according to the number of gray level by a LED driving chip.

5. A device of LED driving pulse modulation, characterized in that the device comprises:
    a first calculation module being configured to calculate a display period according to a set number of sub-period, a set number of gclk (i.e., gray scale clock) per line and a set number of line scan;
    a conversion module being configured to convert input gray data according to a set number of gray level;
    a division module being configured to divide the converted gray data according to the number of sub-period, the number of gclk per line, and a composite number to obtain high-gray data, low-gray data, and compensation data; and
    a second calculation module being configured to calculate a number of gray level that needs to be displayed in a current sub-period according to the high-gray data, the low-gray data, and the compensation data.

6. The device of LED driving pulse modulation according to claim 5, wherein the device further comprises a setting module being configured to set the number of gray level according to the number of sub-period and the number of gclk per line.

7. The device of LED driving pulse modulation according to claim 5, wherein the device further comprises an adjustment module being configured to comparing the display period with a set frame rate time, and if the display period is greater than the set frame rate time, adjusting the number of sub-period or the number of gclk per line, so that the time of the display period is less than the set frame rate time.

8. The device of LED driving pulse modulation according to claim 5, wherein the conversion module calculates a gamma table corresponding to the number of gray level by a controller, and converts the input gray data according to the gamma table, or normalizes the input gray data according to the number of gray level by a LED drive chip.

9. A LED display device, characterized in that the device comprises at least one processor and a memory communicatively connected with the at least one processor; wherein the memory stores instructions executable by the at least one processor, and the instructions are executed by the at least one processor so that the at least one processor executes a method of LED driving pulse modulation, wherein the method comprises the following steps:
    calculating a display period according to a set number of sub-period, a set number of gclk (i.e., gray scale clock) per line and a set number of line scan;
    converting input gray data according to a set number of gray level;

dividing the converted gray data according to the number of sub-period, the number of gclk per line, and a composite number to obtain high-gray data, low-gray data, and compensation data; and calculating a number of gray level that needs to be displayed in a current sub-period according to the high-gray data, the low-gray data, and the compensation data.

10. The LED display device according to claim 9, wherein the number of gray level is set according to the number of sub-period and the number of gclk per line.

11. The LED display device according to claim 9, wherein the method further comprises:

comparing the display period with a set frame rate time, and if the display period is greater than the set frame rate time, adjusting the number of sub-period or the number of gclk per line, so that the time of the display period is less than the set frame rate time.

12. The LED display device according to claim 9, wherein in the step of converting the input gray data according to the set number of gray level, a gamma table corresponding to the number of gray level is calculated by a controller, and the input gray data is converted according to the gamma table, or the input gray data is normalized according to the number of gray level by a LED driving chip.

13. A non-transitory computer-readable storage medium, characterized in that the non-transitory computer-readable storage medium stores computer instructions, and the computer instructions are used to cause a computer to execute a method of LED driving pulse modulation, wherein the method comprises the following steps:

calculating a display period according to a set number of sub-period, a set number of gclk (i.e., gray scale clock) per line and a set number of line scan;

converting input gray data according to a set number of gray level;

dividing the converted gray data according to the number of sub-period, the number of gclk per line, and a composite number to obtain high-gray data, low-gray data, and compensation data; and calculating a number of gray level that needs to be displayed in a current sub-period according to the high-gray data, the low-gray data, and the compensation data.

14. The non-transitory computer-readable storage medium according to claim 13, wherein the number of gray level is set according to the number of sub-period and the number of gclk per line.

15. The non-transitory computer-readable storage medium according to claim 13, wherein the method further comprises:

comparing the display period with a set frame rate time, and if the display period is greater than the set frame rate time, adjusting the number of sub-period or the number of gclk per line, so that the time of the display period is less than the set frame rate time.

16. The non-transitory computer-readable storage medium according to claim 13, wherein in the step of converting the input gray data according to the set number of gray level, a gamma table corresponding to the number of gray level is calculated by a controller, and the input gray data is converted according to the gamma table, or the input gray data is normalized according to the number of gray level by a LED driving chip.

* * * * *